United States Patent [19]
Gross et al.

[11] Patent Number: 5,972,500
[45] Date of Patent: Oct. 26, 1999

[54] NON-LINEAR MULTICOMPONENT GLASS FIBERS FROM LINEAR PRIMARIES

[75] Inventors: Stephen Edward Gross, Littleton; William Henry Kielmeyer, Englewood; Michael D. Peterson, Parker; Jon F. Bauer, Castle Rock, all of Colo.

[73] Assignee: Johns Manville International, Inc., Denver, Colo.

[21] Appl. No.: 08/919,678

[22] Filed: Aug. 28, 1997

[51] Int. Cl.[6] ........................................................ D02G 3/00
[52] U.S. Cl. ............................ 428/370; 428/371; 428/373
[58] Field of Search ..................................... 428/903, 370, 428/369, 220, 392, 399, 373, 374, 222, 340, 398, 427, 428, 438; 65/402, 405, 502, 504; 252/62

[56] References Cited

U.S. PATENT DOCUMENTS

| | | | |
|---|---|---|---|
| 5,431,992 | 7/1995 | Houpt et al. | 428/224 |
| 5,639,291 | 6/1997 | Kielmeyer et al. | 65/438 |

*Primary Examiner*—William Krynski
*Assistant Examiner*—Chris Cronin
*Attorney, Agent, or Firm*—Robert D. Touslee

[57] ABSTRACT

Glass fibers of curly habit may be prepared from a heterogeneous melt of blended particles of at least two distinct glasses. Linear glass primaries controllable in pot and marble processing may be prepared from the heterogeneous melts. Fibers prepared from the randomly heterogeneous primaries exhibit a unique biodissolution mechanism and high biodissolution rates. The process is also amenable to other glass fiberization processes, including the rotary process and the sliver process.

18 Claims, 6 Drawing Sheets

NON-LINEAR MULTICOMPONENT GLASS FIBERS FROM LINEAR PRIMARIES

TECHNOLOGICAL FIELD

The present invention pertains to nonlinear, multicomponent glass fibers obtained from substantially linear primaries preferably produced from a single, heterogeneous melt of two or more distinct glasses. The subject invention further pertains to processes for producing such fibers and to glass fibers having enhanced biosolubility produced thereby.

DESCRIPTION OF RELATED ART

Non-linear bicomponent glass fibers were disclosed as at least as early as 1961 in U.S. Pat. No. 2,998,620. In the '620 patent, curly bicomponent fibers are produced by centrifuging two different homogenous melts of glass from spinner orifices in the rotary fiberization process, where they combine to form bicomponent glass streams which are then attenuated into curly fibers by hot gas jets. The process employs glasses which have significantly different coefficients of thermal expansion such that the glass fibers become curly due to differential contraction upon cooling. Improvements in the process disclosed in the '620 patent are the subject of recent U.S. Pat. Nos. 5,514,199, 5,468,275 and 5,529,596. In U.S. Pat. No. 5,529,596, for example, a cross-sectional area of the fibers produced show one component of a glass which is relatively viscous in the melt, surrounded fully or partially by a less viscous glass. These processes require an undefined, varying (stochastic) attenuation environment in order to produce randomly curly fibers.

Fiberglass, whether of the single component or bicomponent type, has many uses, for example, as building insulation, acoustic insulation, air and water filters, battery separators, resin impregnated lofty mats which can later be thermoformed to produce head liners, hood liners and the like, etc. The curliness of the fibers disclosed in the '596 patent and the '620 patent makes these glass fibers useful in many applications where products must be compressed and then upon decompression, recover a substantial part of their thickness. In the past, it has been necessary to employ a variety of binder resins, for example, phenol/formaldehyde resol resins or melamine-based resins, in order to provide the recovery necessary. Naturally curly fibers may be able to produce insulation products, filter media, and the like without requiring the use of a binder, by requiring less binder than ordinarily necessary, or by employing the same amount of binder, while further enhancing recovery. The efficiency of fiberglass filters has been shown by U.S. Pat. No. 3,073,005, to be enhanced when curly fibers are utilized.

However, while bicomponent fibers have been produced by the centrifugal spinning of two separate homogenous glass melts through adjacent orifices, production of bicomponent or multicomponent fibers by the pot and marble process is much more problematic. In the latter process, molten glass exits the pot through a ring of orifices, producing relatively large diameter glass fiber "primaries". These glass fiber primaries must be "laced" into guides, and then fed to a flame attenuation apparatus where the relatively larger diameter primaries are flame attenuated into relatively small diameter fibers. It is possible to design pots containing multiple chambers for homogenous melts of glass, and provide such dual chamber pots with complex orifice arrangements to allow for the side-by-side preparation of strands of different glasses, or to use split orifices, feeding each side of the split orifice with a different molten glass mixture. Such a process is disclosed in U.S. Pat. No. 3,073,005, for example. These methods, however, are expensive and cumbersome, and require the construction of relatively expensive new pot and marble equipment. Thus, continuous production of bicomponent or multicomponent fibers from pot and marble equipment has not heretofore been practiced.

With respect to the rotary process, the aforementioned patents provide evidence of the complexity of the "disks" necessary to produce bicomponent fibers by the processes disclosed therein. The necessity to provide these unique spinning disks renders the production of bicomponent fibers more expensive and less flexible, as conventional disks cannot be used.

Many of the operations involved in preparation of the products described previously involve the repetitive handling, cutting, and the like of fiberglass products. During such handling operations, glass fibers may be retained in the skin, or in some cases, airborne fiberglass particles resulting from these handling and cutting operations may be inhaled and find their way into the lungs. It is believed by some that the ingestion or inhalation of glass fibers may serve as a nucleus for irregular cell growth, for example benign and malignant carcinomas. Thus, great efforts have been expended in recent years to attempt to provide glass fibers which provide both less chance of inhalation or ingestion, and which further offer higher solubility such that the glass fibers may be metabolized by the biological system. These efforts so far have not been entirely satisfactory. Moreover, while increased biosolubility is desirable, at the same time, the glass fibers must generally be resistant to other chemical attack, and in particular must be moisture resistant. These very conflicting goals render the production of "fiber friendly" glass fibers exceptionally problematic.

It would be desirable to employ pot and marble and other processes to produce glass fibers of a curly nature without the use of split orifices or other complicated and expensive pot and marble or unique rotary fiberizing equipment. It would further be desirable to produce glass fibers which exhibit satisfactory chemical and/or moisture resistance and improved recovery, yet which offer increased biosolubility.

SUMMARY OF THE INVENTION

The present invention employs a single, randomly heterogeneous melt of at least two distinct glasses to produce permanently curly fibers irrespective of the fiberization process employed, and through use of essentially standard processing equipment. The single, randomly heterogeneous melt may be prepared by melting a blend of two or more different types of glass cullet or marble, by melting composite marbles as hereinafter defined, or by combining two molten glass streams in such a manner that refinement is substantially prevented. The resulting curly glass fibers have a permanent, "physico-chemically-induced" curl, and may be used with or without conventional binders, processing aids, and the like.

The invention preferably utilizes a pot and marble process employing standard pot and marble equipment to produce substantially linear multicomponent glass primaries which can be flame attenuated to produce multicomponent curly glass fibers. The curly glass fibers may be composed of glasses which offer exceptional physical properties, and yet which demonstrate a unique biosolubility mechanism in simulated physiological fluids, exhibiting dissolution rates over time which are considerably higher than the rates exhibited by the same glasses when used in single component glass fibers. The preferred process involves the addition of a well mixed blend of large size cullet and/or marbles to the pot and marble melting pot, and melting this mixture to form a single, heterogeneous glass mixture which is then spun through the pot orifices to form relatively linear primaries having a multiplicity of zones of distinctly different glasses. These relatively linear primaries are then flame attenuated, the result being the production of naturally curly and highly biosoluble fibers. A random, heterogeneous melt may also be used in the rotary and sliver processes to produce curly fibers.

DESCRIPTION OF THE PREFERRED EMBODIMENTS

Figure 1:
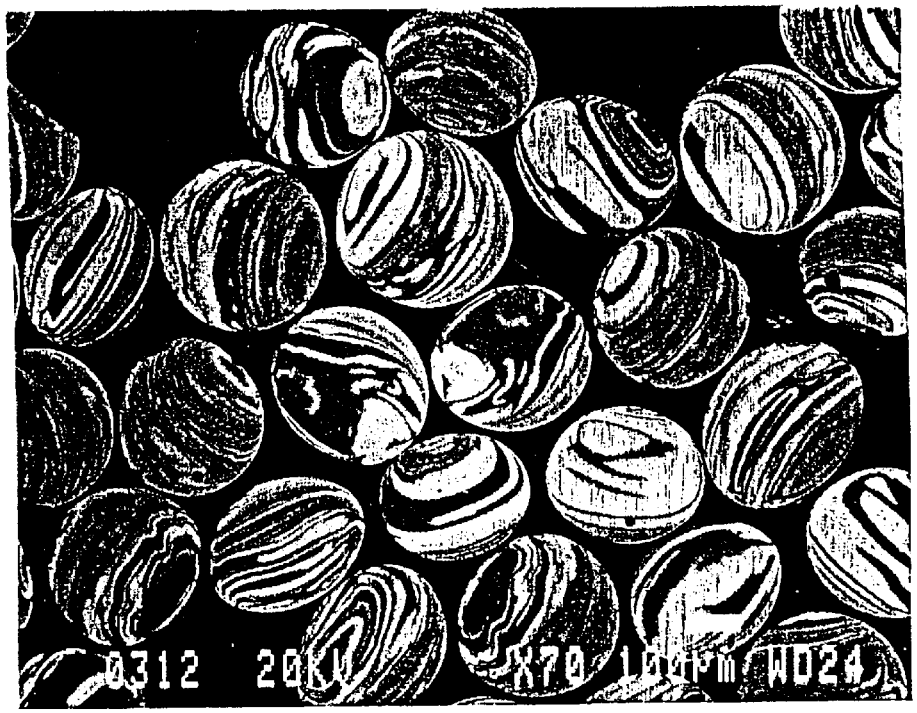
FIG. 1 shows the heterogeneous nature of a cross-section of multicomponent glass primaries in accord with one embodiment of the subject invention.

The multicomponent glasses of the subject invention may be made by the pot and marble process coupled with flame attenuation, by the rotary process, or by other processes in which multicomponent "primaries" can be produced from a single, heterogeneous melt, and attenuated into curly fibers. The details of glass fiberization are well known. Reference may be had to FIBERGLASS, J. Gilbert Mohr and William P. Rowe, Van Nostrand Reinhold Co., N.Y. ®1978, and to many United States and foreign patent references. While the majority of the disclosure herein will be directed to use of the pot and marble process with flame attenuation, one skilled in the art will recognize that the principles and procedures expressed herein are also applicable to other processes as well, particularly the rotary process, the sliver process and the spinning process.

The preferred process employs traditional pot and marble equipment. The pot, containing molten glass maintained above the fiberization temperature, has a plurality of orifices along a bottom portion thereof, through which glass exits the pot forming a corresponding plurality of primaries. The orifices are generally arranged on the bottom of the pot in a circular array, or an array of several concentric circles. Other arrangements are, of course, possible. A well blended heterogeneous mix of at least two different glasses in the form of solid cullet, marbles, broken marbles, etc., are introduced into the pot by conventional means. Agitation is avoided, the heterogeneous charge liquefying to form a single, randomly heterogeneous melt, rather than a homogenous melt.

The heterogeneous melt exits the orifices to form a multiplicity of heterogeneous primaries. A cross-section taken across a random selection of primaries will show a randomly variegated structure which in general comprises a multiplicity of distinct glass phases, different phases (demes) corresponding substantially to distinct glasses charged to the pot. Because the solid charge of cullet or marbles is well mixed, but random at any given locus in the pot, the cross-sectional composition of the primaries is variegated randomly along both the length of the primaries and over the primaries' cross-sections, as illustrated with particularity by the photomicrographs submitted herewith.

The heterogeneous primaries travel within guides (one skilled in the art speaks of the primaries being "laced" within the guides) through pull rolls, and into an attenuation zone. Attenuation is performed by a flame jet produced by burning a mixture of combustible gas and compressed air which exits through a long and rather narrow opening across which the primaries descend. The fibers are attenuated by the flame to fibers having diameters as small as $2\times10^{-6}$ inch (0.05 $\mu$m), and as large as 15 $\mu$m or more, but commonly in the range of about 0.5 $\mu$m to 6 $\mu$m, more preferably about 0.75 $\mu$m to 3 $\mu$m. The attenuated fibers are blown into a forming tube and from there into a transition zone prior to being deposited on a moving conveyor.

In the pot and marble process just described, it is necessary that the primaries be substantially linear. Linear primaries may be easily laced within and maintained within the carbon guides. If the primaries are wavy, they cannot be maintained within the guide bushings. If individual melts of two glasses having significantly different coefficients of thermal expansion (CTE) or solidus temperatures are drawn through a divided, single orifice, the primaries become uncontrollable due to the waviness created due to the aforementioned differences. In a centrifugal (rotary) process, where the "primaries" do not run in guides but are attenuated as they exit the disk orifices, whether the "primaries" are linear or wavy is inconsequential. Such a process employing two distinct glasses is described in U.S. Pat. No. 5,468,275 cited previously. However, in the pot and marble process, where the primaries must pass through bushings, substantially linear primaries are a necessity. The term "substantial", as it pertains to the linearity of the primaries, indicates a degree of linearity such that the primaries may be maintained within their guides during fiber production.

It has been surprisingly discovered that a single heterogeneous melt may be used to produce linear primaries from a pot and marble process. These primaries may be maintained within their respective guides, and yet, when further attenuated, produce curly as opposed to linear fibers. Without wishing to be bound to any particular theory, it is believed that both axially and diametrically, the random heterogeneous nature of the primaries created by this process are at least partially responsible for the lack of waviness which would ordinarily be expected of multicomponent primaries.

With respect to axial randomness, any tendency for the solidifying primary to curl in a given direction will change as the distribution of the various glass phases changes randomly along the length of the primary. With respect to the diametrical randomness, or cross-sectional composition, this, as described previously, tends to comprise a multiplicity of zones of different glasses. For any given small incremental length, rather than simply a pair of glasses forming two distinct zones, a multiplicity of partially parallel zones are created, similar to a multilayer laminate. While a two component primary would be expected to curl greatly, similar to what is expected of a bimetallic spring, a primary cross-section which has many such zones would be expected to remain relatively straight.

What is truly surprising is that the linear, multicomponent, heterogeneous primaries give rise, when attenuated, to curly fibers. It is not known why this is the case, particularly as curly fibers have been produced in the subject process from glasses having nearly the same CTE. However, it is believed that the axial randomness of the primaries, where glass composition may change rather rapidly along the length of the primary, is replaced in flame attenuated fibers by a fiber where the axial randomness is far less, long lengths of fiber having substantially the same composition axially.

By the term "primary" and its plural "primaries" is meant relatively large diameter glass fiber intermediate(s), i.e., in a non-limiting sense from about 10 $\mu$m to about 1 mm in diameter, which will subsequently be attenuated into finer diameter fibers by suitable means. In the pot and marble process, for example, the diameter of the primaries will depend upon several variables including glass viscosity, pull rate, orifice diameter, glass composition, etc., but is generally from about 200 $\mu$m to about 600 $\mu$m, with both larger and smaller diameters possible as well. In the rotary process, the "primaries" are the relatively large diameter fibers which exit the spinner orifices prior to being attenuated by hot gas, and are generally of smaller size than those of the pot and marble process.

Unlike the pot and marble process, where the primaries must remain substantially linear, in the rotary process, the primaries may exhibit considerable curl themselves. In the conventional, single-component glass rotary process, a stream of molten glass is introduced into a rapidly rotating "disk" which contains numerous fine orifices in an outer side wall located at its periphery. The number of orifices and their size may vary greatly. For example, the annular outer side walls frequently have between several hundred to several thousand orifices ranging in diameter from about 30 $\mu$m or less to in excess of 100 $\mu$m. As the glass fibers exit the orifices in the disk periphery, they encounter a downwardly flowing blast of hot air or combustion gasses from an annular ring and/or burner which surrounds the disk. The high velocity hot air or combustion gasses attenuate the fibers to whatever degree is necessary, and the fibers generally traverse a forming tube, following which they are collected on a moving belt in a fashion similar to that of many other fiberization processes.

Figure 9:
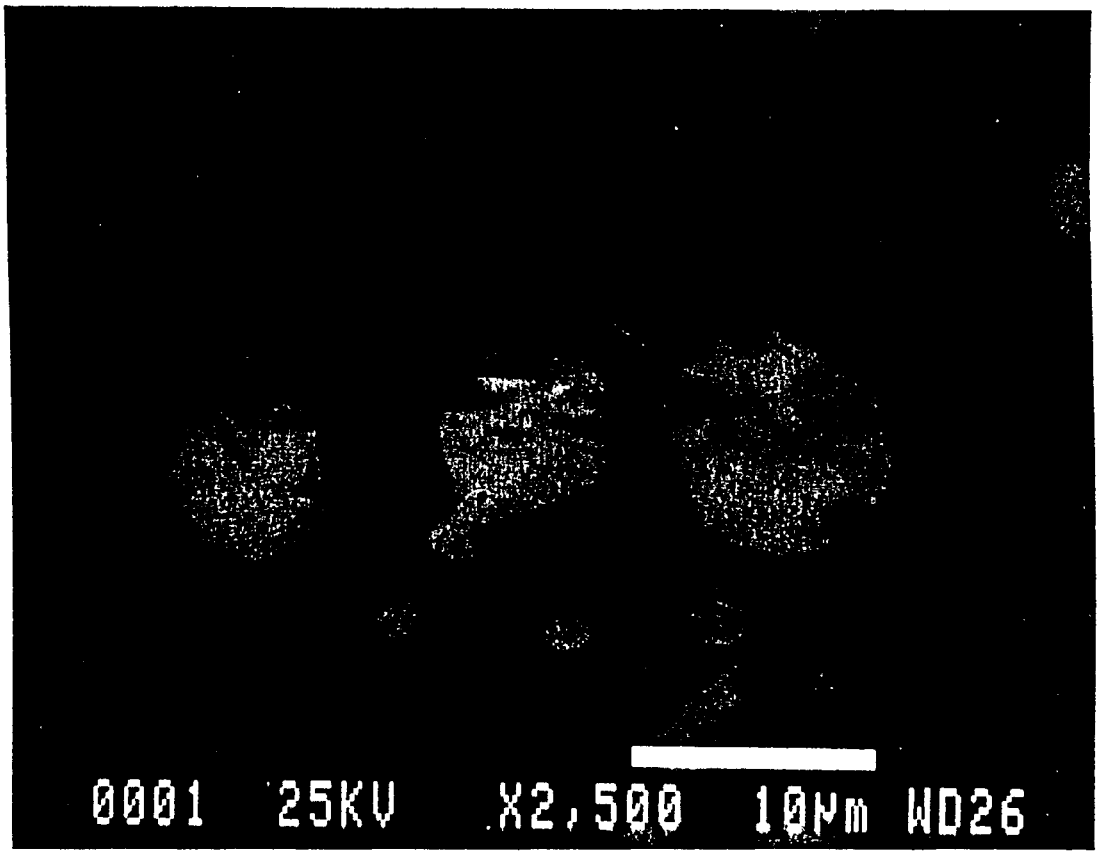
FIG. 9 is a photomicrograph of an end view of a bicomponent fiber produced by the subject process.
Figure 9A:
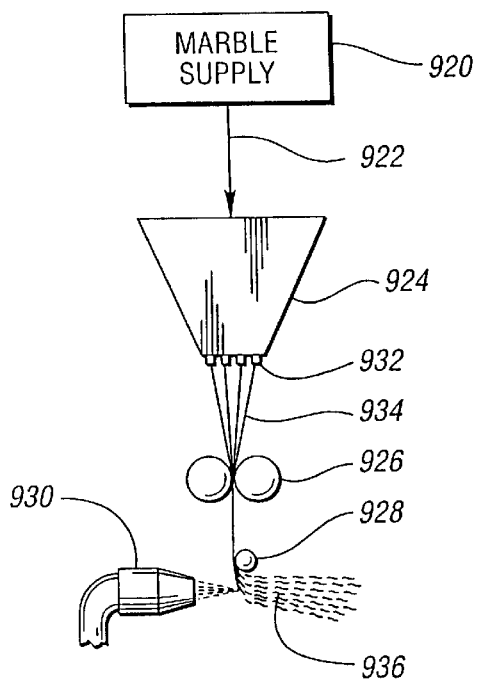
FIG. 9a and 9b illustrate two embodiments of a process for employing mixed glass in a pot and marble process to provide bicomponent curly fibers such as those of FIG. 9.

Cross-sections of attenuated glass fibers are shown in FIG. 9. The irregular nature of the glass composition distributions is easily seen. This structure appears to reflect, at least in part, the glass distributions of the primaries from which the fibers are formed. FIG. 9a may be used to prepare such fibers, and represents a preferred embodiment of the subject invention. Hopper 920 contains a well mixed blend of marbles, cullet, etc., which is fed through feeder stream 922 to a pot and marble process pot 924. The glass blend melts in the pot, which is devoid of stirrers, agitators, bubblers, and the like, to form a single, randomly heterogeneous melt which flows through fiberization orifices 932 to form substantially linear primaries 934. The primaries are pulled through pull rolls 926 over guide bar 928 where they are attenuated by a blast of hot gas from blast burner 930, to form attenuated fine diameter fibers 936.

Figure 9B:
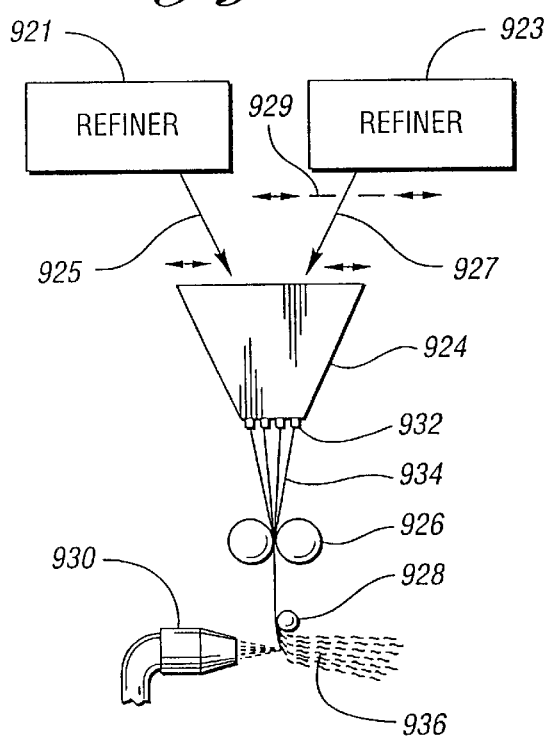

In FIG. 9b, a similar process is used, with all common components the same as in FIG. 9a. However, in FIG. 9b, the hopper 920 has been replaced by two separate refiners 921 and 923, each preferably containing a melt of a single glass, the glasses in the respective refiners being different from each other. From the refiners, streams of glass 925 and 927 are directed to a pot in oscillatory, crisscross, or other random or pseudo-random fashion such that the pot 924 contains a mixture of randomly distributed glass. At 929 is an optional cutter or "shutter" which divides the substantially continuous glass stream into separate globules of molten glass to assist in randomizing.

Figure 10A:
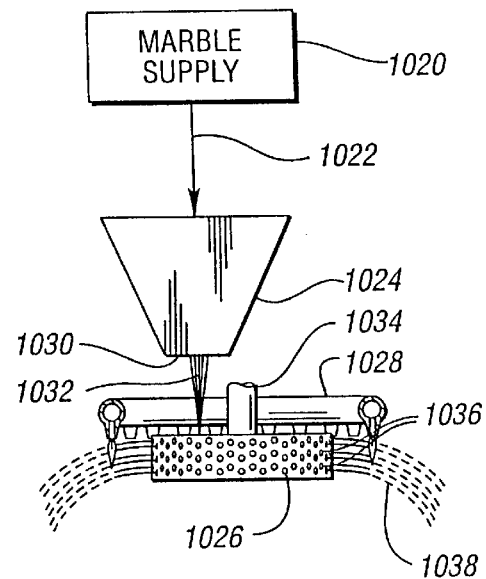
FIG. 10a and 10b illustrate two embodiments of a process for employing mixed glass in a rotary process to provide bicomponent curly fibers.

The rotary process of the subject invention, employing randomly heterogeneous glass melts, may be illustrated with respect to FIG. 10a. In this process, the apparatus includes a marble or cullet supply 1020, feeder stream 1022, a melting pot 1024, a rotary fiberizing disk 1026, and an annular burner or hot air ring 1028. The melting pot 1024 has one or a relatively small number of orifices 1030 which supply one or more streams 1032 of the randomly heterogeneous two phase melt to the interior of the rotary fiberizing disk 1026.

A typical rotary fiberizing disk 1026 would be from about 8 to 30 inches in diameter and would be fabricated conventionally from a high temperature resistant alloy. The fiberizing disk 1026 is mounted on a vertically extending, motor driven drive shaft or axle 1034 and is rotated at several hundred to several thousand revolutions per minute during the fiberizing process. The annular outer side wall of the rotary fiberizing disk typically has several hundred to several thousand fiberizing orifices 1036 having a range of sizes from about 30 $\mu$m to about 100 $\mu$m or more in diameter which are formed in the outer annular side wall (periphery) by conventional fabricating techniques.

During the fiberization process, the molten stream 1032 of the heterogeneous two phase melt is introduced into the interior of the rotary fiberizing disk 1026 and onto a base plate of the fiberizing disk. The centrifugal force caused by rotation of the fiberizing disk 1026 causes the molten two phase melt to flow outward to and up the annular outer side wall 1036 where the two phase melt is fiberized by passing through the fiberizing orifices in the periphery. Once the bicomponent primaries 1038 are formed by the passage of the two phase melt through the fiberizing orifices, the primaries 1038 may be collected, but are generally attenuated by application of a high energy gaseous blast of hot air or combustion gases from the annular air ring or burner 1028. As in the conventional rotary fiberization processes, the high energy gaseous blast of hot air or combustion gases directs the fibers downward, often through a duct or forming tube, onto a generally horizontal chain collection belt which typically conveys the fibers away from packaging or further processing.

Figure 10B:
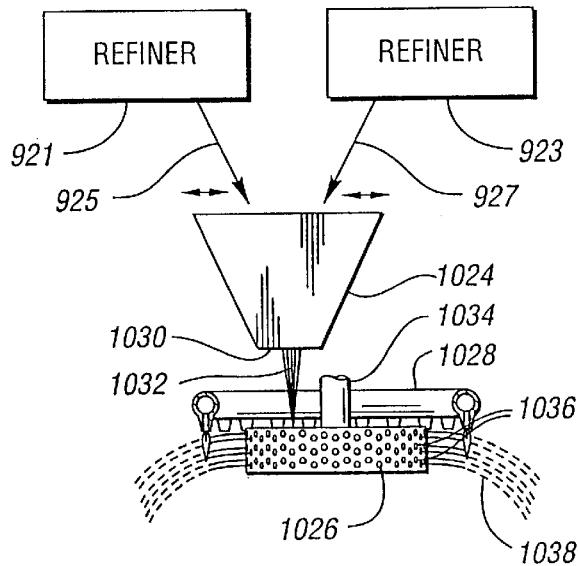

In FIG. 10b is illustrated a further embodiment of the rotary process, the components in common sharing the same numerals as FIG. 10a. However, in FIG. 10b, the glass supply means is substantially the same as that shown for pot and marble process FIG. 9b, and the numbering of FIG. 9b has been retained for these components as well.

In the "sliver process" a process similar to that of the pot and marble process is practiced. However, rather than the glass primaries being attenuated by a jet of hot combustion gases, i.e. flame attenuated, the fibers are mechanically attenuated by being pulled round a rapidly rotating drum. For example, the glass may exit from a generally rectangular bushing and be pulled around a rapidly rotating drum one meter in diameter, the fibers just formed being removed from the drum by the use of a doctor blade. See, for example, FIBERGLASS, J. Gilbert Moore, pp. 13–14. In a similar process, the glass may be mechanically attenuated by a series of high speed rotating wheels in a process denoted the "spinning process" as described by Moore on pp. 11–12.

In the preferred process according to the subject invention, a single, heterogeneous melt may be produced by introducing a well mixed blend of two or more different glasses into a pot or furnace, as the case may be, and forming, from this heterogeneous melt, glass "primaries" with a random distribution of glasses. The glass "primaries" are then attenuated into curly glass fibers of fine diameter. Regardless of the actual process used, it is necessary that the glass be provided as a single, randomly heterogeneous melt to he fiberization orifices. In all the processes described above, one of the most convenient ways of providing a single, randomly heterogeneous glass melt to the process is through the use of a well blended mix of rod, cullet, marbles and the like. Alternatively, it is possible to use a single supply of marbles which themselves are bicomponent, i.e. essentially each marble contains more than one glass. However, this process, employing bicomponent marbles, rods, or cullet, would require a separate process to produce such bicomponent glass sources, as these are not used in glass production.

The use of bicomponent marbles, or a well blended mixture of two or more sources of cullet, marbles, or the like, when melted, will produce a randomly heterogeneous yet single melt of glass. By the term "randomly heterogeneous" is meant that at any given point in time, the glass composition in the neighborhood of the primary-forming or fiberization orifices will be difficult if not impossible to predict. In the pot and marble and similar processes, i.e. the spinning process or the sliver process, this randomly heterogeneous nature of the melt will generally extend well into the pot itself. Thus, in any given location of the pot, the composition of the glass at the location will change randomly over time in an unpredictable manner.

It is also possible to prepare randomly heterogeneous melts in a manner other than that described above. For example, two or more individual, homogenous melts of different glasses may be combined in such a way that the glasses maintain their substantial identity, and are presented to the orifices in a substantially random fashion. For example, in the pot and marble and similar processes as well as in the rotary process, two individual streams of glass may be combined in a random or pseudo-random fashion by oscillating or otherwise directing the two or more supplies of glass to the pot or spinner, thus laying down two different streams of glass which more or less randomly criss-cross each other. The glass streams thus supplied may be continuous streams, or may be intermittent globules of glass which are derived from an otherwise continuous stream by means of a cutting or shutter-type device. Even though the movement of such a device employing two or more different streams of glass may not be entirely random, i.e. will ordinarily be the result of a fixed, repetitive mechanical movement, the distribution of the glass in the pot or disk will still be random due to the essentially random flow conditions which exist from the point in time at which the glass enters the pot and the time at which the glass exits the primary-forming or fiberization orifices. When two individual melts are combined to form a single randomly heterogeneous melt, it is desirable that the temperature of the streams prior to their combination be as low as possible, i.e. as close to the fiberization temperature as possible. In this manner, the relatively high viscosities of the two phases assists in preventing homogenization, or "refinement", of the mix.

It is also possible, as shown in FIG. 10, to produce a single strand or ribbon from a heterogeneous melt. In this case, the glass supply is similar to that which would be obtained by the pot and marble process employing a well mixed blend of marbles or cullet, except that instead of a large number of primaries exiting the bottom of the pot, one or a relatively small number of rather large orifices are employed. This method is highly suited to the rotary process, one or more of such larger diameter randomly heterogeneous strands being supplied directly to the fiberization disk. However, this method is suitable for other processes as well.

The fibers prepared in the present process are curly fibers. By the term "curly" as it pertains to fibers is meant fibers which have a recognizable non-linear aspect in comparison to fibers formed from a single homogenous melt. Such fibers exhibit a permanent, pronounced, and physico-chemically-induced curl, which may manifest itself as a curve of relatively constant radius, a spiral, or a fiber which curls first one way and then another, often in random fashion. The recognizable non-linear aspect of the fibers is readily ascertainable by inspection by one skilled in the art of glass fiber production. In a non-limiting sense, the average of the ratio of the curvature of the glass fibers to their diameters may advantageously range from about 10:1 to about 100:1.

Figure 2:
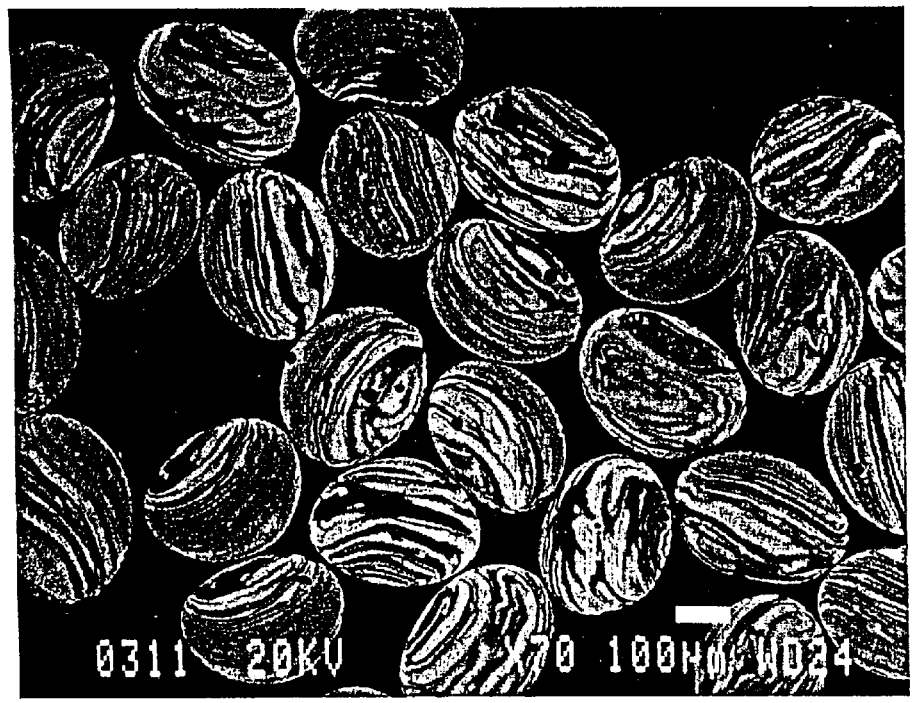
FIG. 2 shows the heterogeneous nature of a cross-section of multicomponent glass primaries in accord with one embodiment of the subject invention.

By the term "physico-chemically-induced," as that term pertains to curl, is meant that the curl is due to physical differences between the glasses which make up the fibers, these physical differences due in turn to the differences in glass chemical composition. When viewed microscopically, single-glass fibers exhibit little or no curl as illustrated by FIG. 2, with many "straight", or "linear" fibers. However, curly glass fibers have significant curl, and relatively few linear fibers. The permanent, physico-chemically-induced curl is to be distinguished from the "non-permanent" curl which occurs during fiber collection as the result of fiber orientation in the fiber mass. For example, fibers of single glasses can appear to be curled when examined within a fiber mass due to the randomness of their orientation when pressed against a chain or other collection medium. However, these fibers lack the internal energy necessary to exert a restoring force when distorted form a neutral position, and will not remain curly if disentangled. Physico-chemically induced curly fibers are more apt to recover from the effects of external forces applied to them when the forces are removed (recovery from compression, for example).

In order to produce curly fibers, the two or more glasses of which the fibers are composed must be different in at least one physical property. However, in some cases, this difference need not be large. Curly fibers are produced in the subject invention when the liquidus temperatures are different, the coefficient of volume or linear thermal expansion are different, the transformation temperatures are different, the tensile strain characteristics are different, or their respective surface energies are different. As the fibers cool down after having been attenuated, the differences in physical properties induce stress which manifests itself in a curly fiber. In general, the greater the difference in these properties, for example, the more pronounced the curl.

High-temperature viscosity, "HTV", is the temperature at which the glass viscosity is $10^3$ poise. A particular benefit to the use of the subject invention process is the ability to utilize glasses which are not acceptable for fiberization into bicomponent fibers by processes other than that of the present invention. For example, the process described in U.S. Pat. No. 5,529,596 and like patents requires glasses with similar HTVs, i.e. preferably within 70° F. (39° C.) of each other. At the same time, these glasses must have dissimilar coefficients of thermal expansion (CTE) (measured at room temperature). Due to the limitations on both the HTV differential and the CTE differential, the number of glasses useful in the process descried in the foregoing U.S. patent is limited.

In the subject invention, by employing the technique of co-mingling the glasses in random fashion well in advance of the point of fiberization, an advantage over the prior art is created that is more significant than just ease of processing and reduced capital requirements. This technique also allows the manufacture of co-fibers from glasses with large ΔHTV. For example, a rather hard pot and marble glass with an HTV of 1965° F. (1074° C.) has been successfully combined with a much softer, rotary-type glass with an HTV of only 1820° F. (993° C.), with a resultant ΔHTV more than twice the limit specified by the related art. This mixture was then processed by the rotary process into high quality, curly fiber using a standard fiberizer and fiberizing disk. The fiber pelt exhibited the high loft and resiliency that is deemed desirable in bicomponent products. Similar fibers have been produced by combining granules of mixed glasses in standard pot and marble configurations.

The ability to produce bicomponent fibers like those described above offers many benefits over the related art. Clearly, the most important benefit is that glass formulations can be developed for this application that do not have to meet the dual constraint or similar HTVs and CTEs. As the above example demonstrates, standard fiberizing glasses can be used to generate the curly effect of the fiber. The preparation of curly fibers in the example above is at first glance somewhat puzzling when it is considered that the CTE of the hard pot and marble glass is ~88×10$^{-7}$/°C. and the CTE of the soft, rotary glass is 91×10$^{-7}$/°C. With this small differential, little or no fiber curvature should be expected.

This anomaly can be explained within the context of a more comprehensive explanation of bicomponent curvature. The existing patent literature refers extensively to traditional CTE measurements to characterize the glasses used in bicomponent fibers. However, these measurements reflect only the two dimensional increase in length as a function of temperature increase between 20° C. and 300° C., i.e., near room temperature. There can be several errors involved when applying this simplified model to actual fiber formation.

For example, CTE measures the coefficient of thermal expansion. However, the extent of fiber curl depends on the differential between the coefficients of thermal contraction (CTC). These two values (CTE and CTC) are rarely, if ever, the same. It is not enough to just measure the CTC, though. As indicated by Varshneya, FUNDAMENTALS OF INORGANIC GLASSES, the rate of cooling can have a significant influence on the change in volume with respect to temperature, dV/dT, as a glass transitions from a liquid to stable glass phase. Due to the high surface to volume ratio of fine diameter glass fibers, the glass is cooled very rapidly during fiberization.

Not only does the use of two glasses with high ΔHTV allow for easier formulation to achieve a desired ΔCTE, it also takes advantage of another phenomena documented by Varshneya and others. Above the glass transition temperature of a glass (Tg), the change in volume relative to temperature change, dV/dT, increases by a factor of about three. As the glasses in a such bicomponent fiber cool, the higher temperature glass should stiffen and generally reach Tg first, at which point its contraction rate will decrease. The softer glass will continue to contract at the higher rate until it reaches its Tg. This extra contraction will cause bending stresses similar to those induced by a differential in CTE. By specifying similar HTV's, prior bicomponent fiber manufacture has ignored the effects of this inflection point on the volume-temperature curve.

Other high temperature effects which have been ignored are hysteresis between the V/T curves generated on heating versus cooling; the relationship between fictive temperature, Tf to Tg, due to the rapid quenching rate of fiberglass products; and the significant effect on the V/T curve due to partial crystal orientation of the glass constituents versus fully retained amorphous, glassy structure. While the magnitude of these effects has not been quantified to date, it is relatively easy to predict the type of glass combination required to attain the best match of glasses. A theoretical first glass should have minimal change in dimensions during cooling, therefore should have a relatively high HTV, a relatively low CTE and a very low liquidus temperature. Such a glass would stiffen first during fiber cooling, have reduced contraction during cooling, and also would exhibit minimal dimensionality changes normally associated with glass transitions from amorphous to more ordered structures. A theoretical second glass should have a relatively low HTV, a high CTE and as high a tendency to devitrify as possible, to be the optimal match with the theoretical first glass. The combination of a hard, pot and marble glass and a soft, rotary glass meet the second and third requirements rather well, even though their CTE's are relatively close.

Applicants have surprisingly discovered that glasses with CTE's which are substantially equal may be utilized to form curly bicomponent fibers if the high temperature properties such as volume contraction upon cooling, or fiberization temperatures, are different. Thus, despite the admonition of the U.S. patents cited previously, that the CTE's of the fibers must be significantly different to produce curly fibers, the CTE's of the fibers may actually be the same. For example, they may have a ΔCTE of less than 70 ppm, preferably less than 40–50 ppm. It is noted that these CTE's are the CTE's near room temperature. It may very well be that the CTE's at the fiberization temperatures are actually considerably different and indeed are expected to be different.

Glasses which exhibit different physical properties will have different chemical compositions. At times, even slight changes in glass ingredient mol ratios cause significant change in physical properties. However, the glasses must also be chemically compatible, and preferably "melt compatible" as well. Chemically compatible glasses are those mixtures of different glasses which do not develop crystals within the pot or spinner due to chemical interaction, and/or which do not produce large quantities of cords and beads upon attenuation. For example, mixtures of low alkali, high boron glass with high alkali, low boron glass have developed crystals in the pot of the pot and marble process, and produced brittle primaries containing cords and beads. In like fashion, a high boron glass, when mixed with a high alkali, low boron soda-lime glass, produced calcium silicate crystals. Determination of chemical compatibility can generally be determined by observation of laboratory scale melts of mixed glasses. In the worst case, a trial run may have to take place to observe freedom from excessive cords and beads. This type of experimentation is common even with fibers from single glasses, and is considered routine.

Due to the flexibility of the subject process, pairs (or more) of glasses may be used which have not been identified as suitable in other processes for preparing multi-component fibers. For example, in U.S. Pat. No. 5,536,550, widely different glass chemistries were chosen in order to provide the large differences in CTE required by the disclosed process. However, in the subject process, glass chemistry may be similar, so long as the physico-chemical differences in the glass compositions are such as to result in curly fibers from a heterogeneous melt.

For example, it has recently been discovered that certain glasses with very high boron content have absorptive and scattering properties in the 4 μm to 40 μm infrared range which enables such glasses to be used in preparing fiberglass insulation properties which are considerably more thermally efficient than glasses customarily used to prepare fiberglass insulation properties. These glasses fall within the broad range of 50–64% $SiO_2$; 1–6% $Al_2O_3$; 11–24% $B_2O_3$; 8–15% $Na_2O$; 0–3% $K_2O$; 2–9% CaO; and 1–7% MgO. These glasses are particularly suitable for use in the rotary process, but may be used in other processes as well.

More preferred ranges are given in Table A below:

TABLE A

| Ingredient | Weight Percentage Composition[1] | | |
|---|---|---|---|
| | General | Preferred | Most Preferred |
| $SiO_2$ | 50–60 | 52–58 | 54–58 |
| $Al_2O_3$ | 2–6 | 3–6 | 4–5 |
| $B_2O_3$ | 11–24 | 14–19 | 16–19 |
| CaO | 2–9 | 3–6 | 4–6 |
| MgO | 1–7 | 1–5 | 2–5 |
| $Na_2O$ | 10–15 | 11–14 | 11–13 |
| $K_2O$ | 0–3 | 0.5–2 | 0.5–1.5 |
| $Li_2O$[2] | 0–2 | 0–1 | 0–1 |
| $TiO_2$ | 0–4 | 0–2 | 0–1 |
| $ZrO_2$ | 0–4 | 0–2 | 0–1 |
| BaO[2] | 0–3 | 0–2 | 0–1 |
| ZnO | 0–4 | 0–4 | 0–1 |
| $F_2$ | 0–2 | 0–2 | 0–1 |
| $P_2O_5$ | <1 | <1 | <1 |
| $Fe_2O_3$[3] | 0–5 | 0–2 | 0–0.5 |
| MxOy[4] | 0–5 | 0–2 | 0–0.5 |

[1]Sum of all weight percentages will not exceed 100% in the actual glass.
[2]$Li_2O$ and BaO are generally not preferred (absent) when present, their weight percentages, when added to the weight percentages of other similar oxides should not exceed the totals for those other oxides.
[3]$Fe_2O_3$ represents other iron oxides as well, e.g. FeO, $Fe_3O_4$, etc.
[4]MxOy represents a transition metal or inner transition metal oxide other than iron oxide.

Suitable glass compositions may be as indicated in Table B for example:

glass formulation with a particularly high extinction coefficient, and which also exhibits high in vitro dissolution contains 52.8% $SiO_2$; 5.08% $Al_2O_3$; 20.1% $B_2O_3$; 5.6% CaO; 4.68% MgO; 10.8% $Na_2O$; and 0.9% $K_2O$, and has an HTV ($10^3$ poise) of 1818° F., a liquidus of 1702° F., and an in vitro dissolution rate of 1500 ng/$cm^2$. hr.

The glasses should be "melt compatible". By "melt compatible" is meant that the melt temperatures must be sufficiently similar that the glasses melt at similar rates. If the melt temperatures are sufficiently disparate, the glass with lower melting point will dominate flow in creating the primaries, and a heterogeneous primary may not be obtained. Differences in melt temperature may be partially compensated by increasing the amount of the higher melting glass in the mix. However, as the glass mix becomes increasingly biased toward a single glass, the opportunity for plug flow conditions is exacerbated. If such conditions are established in all or portions of the pot, for example, primaries which consist substantially of one glass will be produced from the orifices involved. When the glass melt temperatures (HTVs) are similar, i.e. within about 200° F. (110° C.), preferably within about 100° F. (55° F.), and most preferably within about 50° F. (30° C.) the glasses will melt at comparable rates; should, in general have reasonably similar viscosities, and will flow at similar rates. A melt compatible glass is one which can create a compositionally stable fiber-producing blend containing two glasses in a ratio of between 30/70 and 70/30, more preferably 40/60 and 60/40.

It should also be noted that, particularly when using flame attenuation, the burner flame is ordinarily normalized to properly attenuate the average primary. With a single glass primary, this is easily accomplished. However, when attenuating bicomponent fibers whose glass distribution is random, the burner will, in general, be normalized for a viscosity intermediate of the individual glass viscosities. If the primaries are composed of glasses of widely different viscosities, lengths of primaries in which a softer glass predominate may produce short, choppy fibers and shot, while lengths in which the harder glass predominate may not be sufficiently attenuated. These same observations may also apply to attenuation by the rotary process.

The size of the glass particles of solid, uniform heterogeneous blends of glass is also important, as is the residence time in the pot or forehearth or its equivalent in the rotary process. In order to produce curly fibers, it is necessary that

TABLE B

| Ingredient | | | | | | | | | |
|---|---|---|---|---|---|---|---|---|---|
| $SiO_2$ | 53.90 | 57.00 | 58.00 | 53.00 | 54.00 | 58.00 | 54.00 | 53.60 | 53.90 |
| $B_2O_3$ | 18.30 | 20.00 | 14.00 | 20.00 | 14.00 | 11.00 | 23.00 | 16.20 | 19.10 |
| $Al_2O_3$ | 4.71 | 4.00 | 3.70 | 5.00 | 6.00 | 4.50 | 4.00 | 4.86 | 4.40 |
| CaO | 5.50 | 2.50 | 5.00 | 6.00 | 6.00 | 5.30 | 5.00 | 6.00 | 4.18 |
| MgO | 3.54 | 1.50 | 3.50 | 4.00 | 4.50 | 3.70 | 3.00 | 4.00 | 3.04 |
| $Na_2O$ | 12.90 | 14.00 | 15.00 | 11.00 | 14.50 | 16.50 | 10.00 | 14.00 | 14.50 |
| $K_2O$ | 1.00 | 1.00 | 1.00 | 0.80 | 1.00 | 1.00 | 1.00 | 1.03 | 0.81 |
| $F_2$ | | | | | | | | 0.51 | |
| HTV, ° F. | 1800 | 1820 | 1820 | 1815 | 1810 | 1820 | 1820 | 1761 | 1760 |
| Liquidus Temperature, ° F. | 1625 | 1400 | 1550 | 1700 | 1700 | 1600 | 1600 | 1653 | 1521 |

Curly fibers prepared from two glasses having such high boron contents have not previously been prepared. Such glasses are expected to possess not only the advantages of curly fibers, but also to possess superior total room temperature radiation heat extinction coefficients as well. A the primaries, or at least a substantial number of them, are heterogeneous, having been prepared from a heterogeneous melt. If the glass particles in the blend of glasses are too small, then the small particle size, in conjunction with the residence time in the pot, forehearth, or furnace, may allow the glasses to "refine themselves", creating a homogenous single glass or a uniform mixture of very small regions of glass (dispersion), rather than a heterogeneous multi-glass melt. Curly fibers will not be produced in either case.

If the glass particles are too large, demes of significant size will be created which may exhibit plug flow of a single glass for significant periods, to be replaced by plug flow of a second glass for an additional period. During these plug flow conditions, linear primaries will be formed which produce only linear fibers. During the transition period between plug flows of separate glasses, primaries having grossly disparate glass distribution across the fiber diameter may be created. The asymmetry created may cause the primaries to curve wildly and/or become brittle, disrupting fiberization in pot and marble processing.

As can be seen from the preceding discussion, the size of the glass particles is in some degree dependent upon the residence time, and hence the glass throughput of the fiberization process. In the pot and marble process, for example, short and long pots may be used, the latter generally containing more glass and hence having larger residence time. The number and size of the orifices also of course, varies the residence time. With pots having shorter residence times, smaller sizes of marble and/or cullet may be used, whereas with pots having longer residence time, larger particles may be necessary. It has been found that particle sizes in the range of ⅛ inch (3 mm) to ½ inch (12.5 mm) or greater, e.g. 15 mm are satisfactory, although smaller or larger particles may be used with particular equipment. However, it is best that the ratio between maximum particle size (mesh) and lowest particle size be not greater than about 4:1, preferably not greater than about 3:1, and more preferably not greater than about 2:1. Mixtures of glass particles with sizes of ⅛ inch (3 mm) to ¼ inch (6 mm) and ¼ inch (6 mm) to ½ inch (12/5 mm) have proven very satisfactory.

The suitability of a given range of sizes may be assessed by examination of the "curliness" of the fibers produced, and also by examination of cross-sections of the primaries. For example, a random selection of primaries may be encapsulated in resin, sawn at right angles to the primary axes, polished, and examined by scanning electron microscopy or optical microscopy, the latter optionally utilizing polarized light, which is helpful in revealing the stresses within the primaries caused by the presence of multiple zones of distinct glasses.

Bicomponent primaries produced from a heterogeneous melt of ¼ inch to ½ inch (3 mm to 6 mm) glass particles from a production-style pot are shown in FIG. 1, which is a scanning electron photomicrograph (SEM). Several notable characteristics are clearly evident. First, the heterogeneous nature of the fiber is illustrated by the dark regions which represent one glass, and the lighter regions of a second glass. Noteworthy is the non-uniform, or random nature of the heterogeneity. The strands are not in any way similar to those of U.S. Pat. No. 5,529,596, which are produced from two homogenous melts and which exhibit on average only two distinct zones of glass. Rather, the primaries of the subject invention, as illustrated by FIG. 1, contain numerous, often roughly parallel (at a given axial position) regions of different glasses. By comparing the various primaries in FIG. 1, it can be seen that there is no regularity in the glass distribution. This lack of regularity is assured due to the use of a heterogeneous melt which is itself random rather than two homogenous melts with multiple or split orifices.

Also noteworthy in FIG. 1 is the fact that the majority of primaries are elliptical rather than circular in cross-section.

While not wishing to be bound to any particular theory, it is believed that the non-uniform cross-section may be due to three contributing factors: the difference in the glass transition temperatures of the glasses; the differences in the glasses' volume contractions or cooling from the melt; and the differences in the glasses' surface energies. The primaries are believed to assume the shapes presented to minimize the stresses created by the asymmetrical coupling of the two distinct glass phases. The primaries have been observed to rotate along their axes as they pass between the pot and first guide roll, which may be indicative of the axial change in glass distribution as the primaries are drawn from the pot. The term "elliptical" is not intended to mean an ellipse in the mathematical sense, but rather is intended to mean a distorted or somewhat flattened circle, which may also be curved, etc.

FIG. 2 is a second SEM illustrating primaries in accordance with the subject invention. These primaries were prepared from the same two glasses as in FIG. 1, but using a smaller particle size range (⅛ inch to ¼ inch; 3 mm to 6 mm). As can be seen by comparing the photomicrographs from FIGS. 1 and 2, the small glass particle size is translated into primaries having a greater number of distinct glass regions but of generally thinner section. The "layered" or "multi-laminar" nature of most of the primaries is more pronounced as compared to the primaries of FIG. 1. In many of the primaries, the major axis of the elliptical cross-section of the primaries coincides with the direction of the glass "laminations". However, with some glass pairs, the directionality of the laminations may vary, with primaries having "laminations" which roughly coincide with the minor axis or otherwise.

Figure 3:
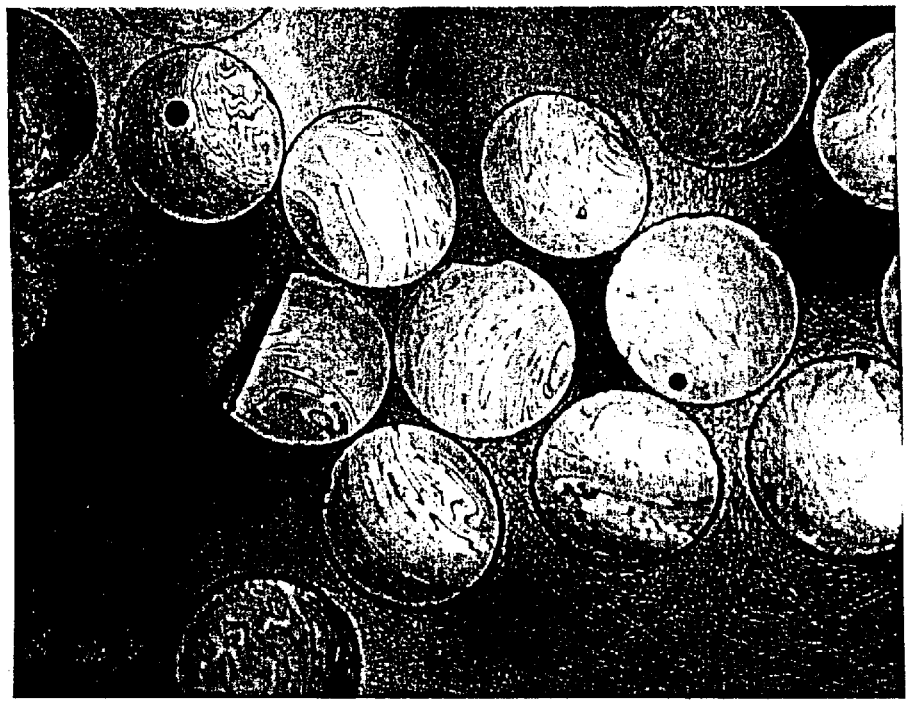
FIG. 3 shows the heterogeneous nature of a cross-section of multicomponent glass primaries in accord with one embodiment of the subject invention; where the distinct glasses have small ΔHTV.
Figure 4:
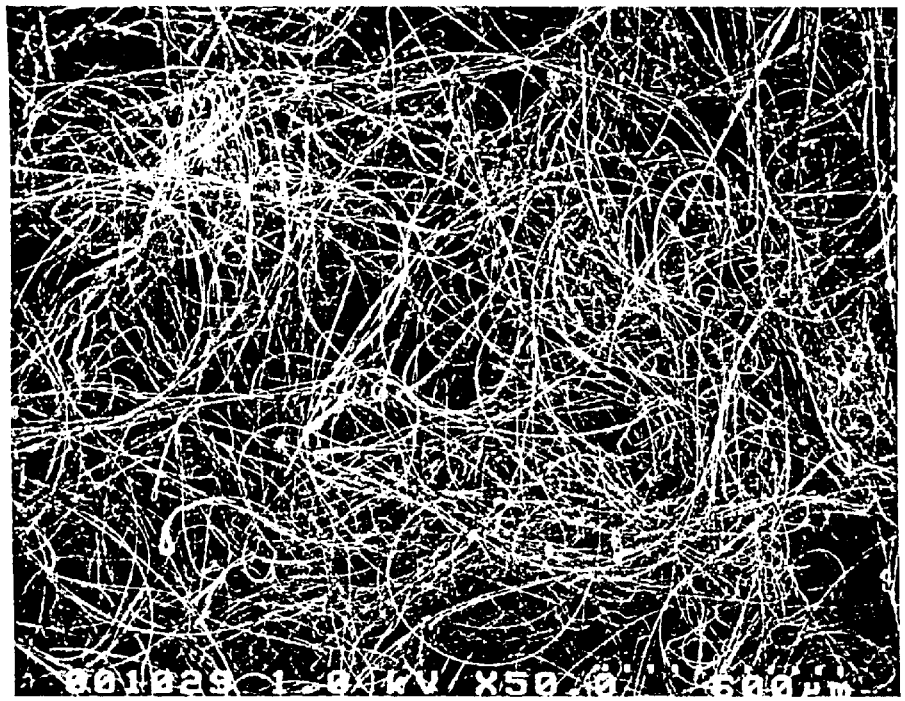
FIG. 4 is a photomicrograph of curly fibers prepared by flame attenuating the primaries of FIG. 3.
Figure 5:
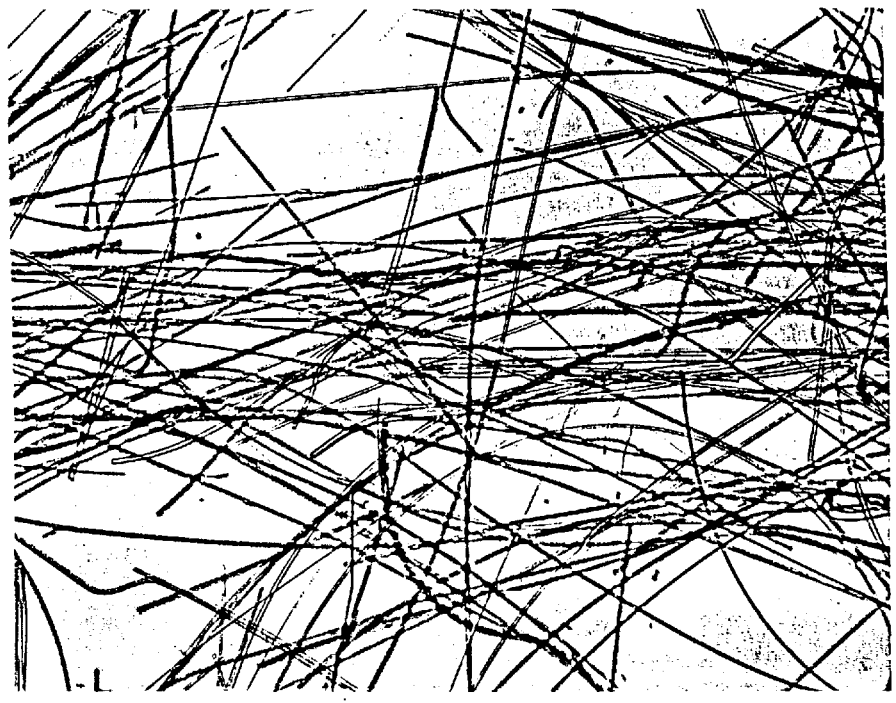
FIG. 5 is a photomicrograph of flame attenuated fibers prepared from a single homogenous melt, not in accord with the subject invention.
Figure 6:
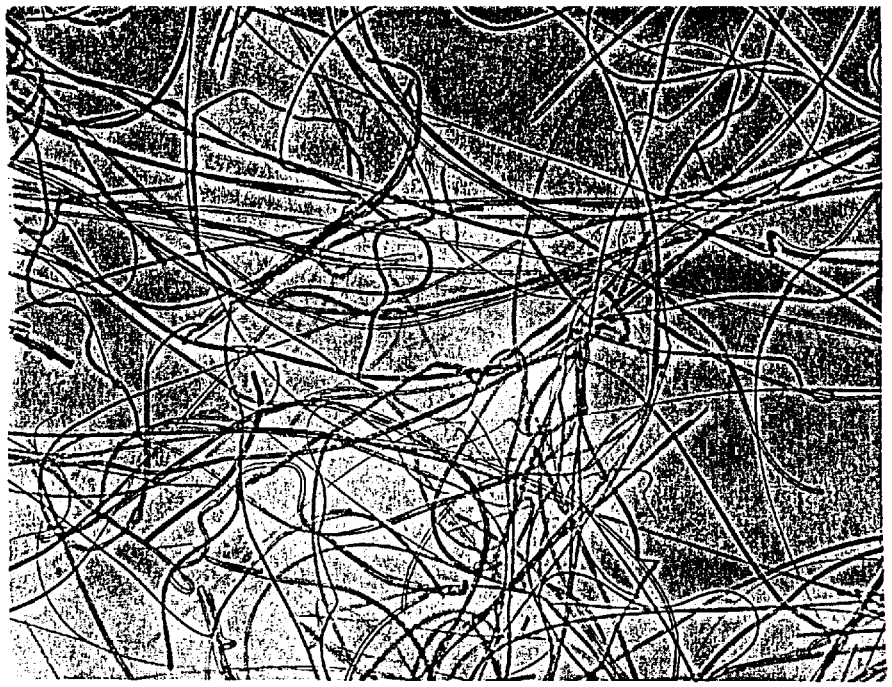
FIG. 6 is a photomicrograph of curly fibers prepared from linear heterogeneous primaries in accord with the subject invention.

In FIG. 3 is shown a photomicrograph of heterogeneous primaries prepared from two glasses purposefully chosen to have similar fiberization temperatures, the differences in high temperature viscosity (HTV) ($10^3$ poise) being only c.a. 36° F. (20° C.). It was thought that by minimizing the HTV difference ($\Delta$HTV), the bicomponent heterogeneous primaries would behave physically like a single glass primary, exhibiting cleaner burnoff, narrow fiber diameter distribution, and less shot. This pattern was observed in a production pot at a 9–11 lb/hr (4–5 Kg/hr) production range. The photomicrograph also shows a less distinct pattern of heterogeneity than the glasses of FIGS. 1 and 2 ($\Delta$HTV≅140° F.; 78° C.). Yet, the heterogeneous nature is still clearly present, as are several primaries of distinct elliptical shape, although not as great in number as those shown in FIGS. 1 and 2. Despite the relatively small difference in HTVs, the heterogeneous primaries of FIG. 3 produced distinctly curly fibers, as shown in FIG. 4.

Biosolubility has become a topic of increasing concern in the fiberglass industry as a whole. It is virtually impossible to completely eliminate the risk of inhaling glass fibers. However, if curly glass fibers are to be produced as disclosed in U.S. Pat. No. 5,529,596, the required differing viscosities of the two homogenous, distinct melts, place limitations on the glass compositions useable. In the present invention, the glass viscosities are preferred to be similar to promote both (or all) the glasses in the melt being drawn rather uniformly towards the orifices through which the primaries exit. Thus, the present invention allows for curly fiber production from glasses, all of which may be selected for characteristics other than their viscosities.

Some glasses suitable for fiberization exhibit lowered biosolubility, as reflected by lower measured dissolution rates in simulated body fluids. Moreover, flame attenuation in the pot and marble process, which takes place at much higher temperatures then the hot gas attenuation of the rotary process, may cause a decrease in dissolution rate. This lower dissolution rate in simulated body fluids (in vitro dissolution) is believed due to the loss of volatiles from the fiber surface during fiberization, which alters the surface chemistry. These "case hardened" fibers are more chemically and biochemically resistant to hydration and dissolution.

The curly fibers prepared by the subject process have been surprisingly observed to have in vitro dissolution rates greatly higher than those observed in otherwise similar fibers produced from either of the glasses singly. For example, single glass fibers prepared from Glass 4 of Table 1 exhibits a $K_{dis}$ of 12 ng/cm$^2$.hr, while curly fibers prepared from a heterogeneous blend of Glass 4 and Glass 5 were some 4 to 5 times higher. Even more surprising is that some combinations of glasses, i.e. those of Glass 4 and Glass 9, not only exhibited dissolution rates higher than Glass 4 alone by a factor of approximately 16, but moreover, the dissolution profile was dissimilar to typical pot and marble glasses, having a loss in mass higher than that predicted by a constant velocity model.

Figure 7:
FIGS. 7 and 8 are photomicrographs of glass fibers of the subject invention following exposure to simulated physiological solution.
Figure 8:
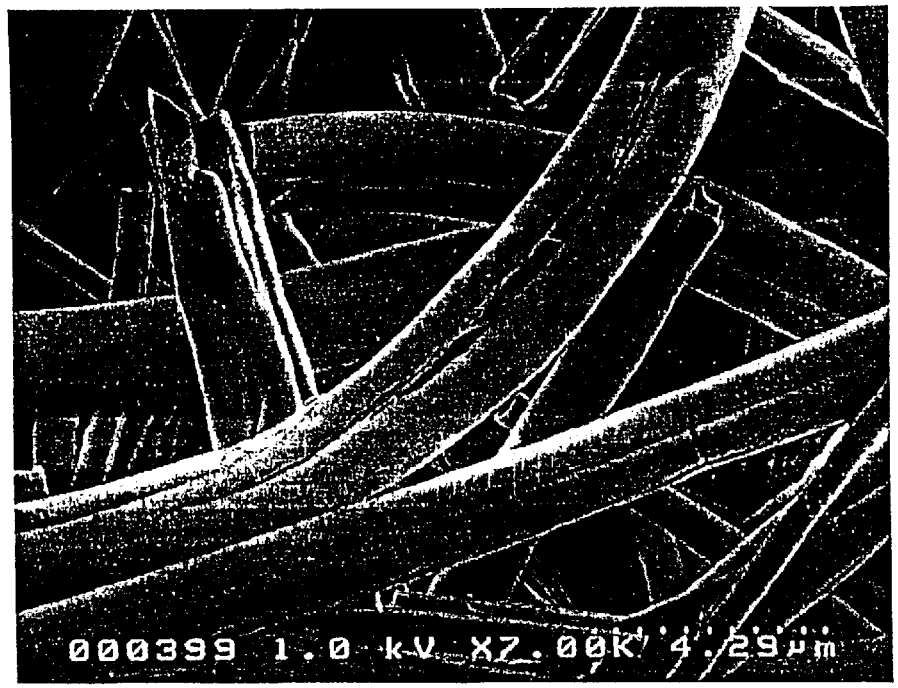

Moreover, microscopic examination of bicomponent fibers of the subject invention following limited dissolution tests revealed a breakdown mechanism which is surprising and heretofore unreported. As illustrated by the photomicrographs of FIGS. 7 and 8, the dissolution pattern is completely different from what one would expect: dissolution radially inward. Rather, as shown in FIG. 7, dissolution appears to proceed preferentially from the fiber ends, leaving thin walls and distorted shells, often compartmentalized. As more clearly evidenced in FIG. 8, many fibers exhibit longitudinal (axial) and lateral cracks. It is hypothesized that the thin skeletal fiber remains will be of such fragility so as to be mechanically broken down into smaller particles which offer yet higher surface area for attack by physiological fluids, and which are potentially capable of elimination by biological transport phenomena.

The dissolution mechanism discovered was highly unexpected, and unlike dissolution exhibited by single component fibers. In retrospect, it may be hypothesized that the numerous heterogeneous demes of distinct glasses produce mechanical stresses which accelerate stress corrosion, particularly at phase boundaries. Other hypotheses are, of course possible. However, whatever the mechanism which is operative, the result is both a totally unexpected dissolution mechanism as well as a highly accelerated dissolution rate.

When selecting varieties and sizes of glass particles for use in the subject process (the compositions, particle size ranges, and process conditions collectively referred to as a "system"), it is important that the glasses be chemically compatible; that they have similar melting rates, in general reflective of similar melt temperatures; and that the glasses retain a significant degree of heterogeneity as they approach and exit the pot and marble or spinner orifices. Glass combinations and/or glass particle sizes which refine themselves in the melt to such a degree that they are no longer significantly discrete, or which remain discrete but exhibit predominately plug flow behavior, are not suitable for use in the subject invention.

It requires only minimal efforts by one skilled in the art to determine the suitability of a particular system for preparation of curly fibers of the present invention. In the pot and marble process, observation of substantially linear primaries which produce curly fibers is evidence of proper selection. In the rotary process, production of curly fibers, optionally coupled with examination of primary cross-section to reveal a multi-laminar, randomly heterogeneous nature, is sufficient.

Each primary should be formed as it exits from but a single orifice. The randomness and heterogeneity of the primaries is not created by multiple orifices each supplying a different glass mixture, nor by split orifices, but by one or more individual orifices fed a randomly heterogeneous glass mixture. It would not depart from the spirit of the invention to supply a heterogeneous melt to a split orifice or even to multiple orifices which are later combined to form a single primary, so long as at least one of the strands exiting from such orifices comprises a randomly heterogeneous melt. By the term "from a single orifice" and like terms is meant that the primary is heterogeneous irrespective of the number of orifices used to form it.

By the terms "on the average" and "on average" and similar terms with respect to the characteristics of the primaries and/or the curly fibers is meant that it is not necessary that each primary or fiber possess the characteristic in question, but that the mode primaries or fibers possess the characteristic. For example, in non-uniform primaries, most of the primaries will exhibit an elliptical cross-section. However, in any given population of primary cross-sections, some will be circular as well. With respect to the distribution of glass demes within the primaries, as a second example, and with respect to FIGS. 1 and 2, some primary cross-sections may not reveal any heterogeneity. Yet a significant number, and preferably a majority, will exhibit three or more distinct demes of glass. By "multiplicity" it is meant 3 or more, preferably considerably in excess of 3, as can be seen in many of the cross-sections of glass primaries in FIGS. 1 and 2.

By use of the term "maximum" with respect to such characteristics as the differences in HTV or CTE, is meant that when more than two glasses are used, for example 3 glasses A, B, and C, the "maximum" of any particular physical quantity will be the greater of the differences in that quantity as between the pairs AB, AC, and BC.

By "multi-laminar distribution" is intended the type of distributions in cross-section characterized by FIGS. 1, 2 and 3. In general, the "laminations" of the multi-laminar structure will not be plane parallel, but will form a series of somewhat concentric circles, ellipses, swirls, etc. By "compartmentalized structure" and like terms is meant the type of structure exhibited by the glass fibers of FIGS. 7 and 8, or other structures where, for example, an exoskeleton is created and at least some fibers exhibit an inner skeleton communicating with the exoskeleton.

In the Examples which follow, glass fibers were prepared by various processes employing equipment and process parameters which are conventional and generally known to those skilled in the art of glass fiber production, other than the use of the heterogeneous melt. Techniques such as optical microscopy and SEM are also conventional.

The procedure used to evaluate biodissolution rate is similar to that described in Law et al. (1990). The procedure consists essentially of leaching a 0.5 gram aliquot of the candidate fibers in a synthetic physiological fluid, known as Gamble's fluid, or synthetic extracellular fluid (SEF) (simulated physiological fluid) at a temperature of 37° C. and a rate adjusted to achieve a ratio of flow rate to fiber surface area of 0.02 cm/hr to 0.04 cm/hr for a period of up to 1,000 hours duration. Fibers are held in a thin layer between 0.2 μm polycarbonate filter media backed by plastic support mesh and the entire assembly placed within a polycarbonate sample cell through which the fluid may be percolated. Fluid pH is regulated to 7.4+0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant could be calculated for each fiber type from the relation:

$$k_{dis}=[d_o\rho(1-(M/M_o)^{0.5}])/2t$$

where $k_{dis}$ is the dissolution rate constant in SEF, $d_o$ the initial fiber diameter, $\rho$ the initial density of the glass comprising the fiber, $M_o$ the initial mass of the fibers, M the final mass of the fibers ($M/M_o$=the mass fraction remaining), and t the time over which the data was taken. Details of the derivation of this relation is given in Leineweber (1982) and Potter and Mattson (1991). Values for k may be reported in $ng/cm^2.hr$ and preferably exceed a value of 150. Replicate runs on several fibers in a given sample set show that $k_{dis}$ values are consistent to within 3 percent for a given composition. Data obtained from this evaluation can be effectively correlated within the sample set chosen—dissolution data used to derive $k_{dis}$'s were obtained only from experimental samples of uniform (3.0 μm) diameter and under identical conditions of initial sample surface area per volume of fluid per unit time, and sample permeability. Data was obtained from runs of up to 30 days to obtain an accurate representation of the long term dissolution of the fibers.

With respect to in vitro dissolution rates, it must be emphasized that the initially measured rate may not correspond with the fiber's ultimate dissolution performance when bicomponent from multicomponent fibers are involved. This is believed so because of the unique dissolution mechanism exhibited by bicomponent fibers of the subject invention. As illustrated in FIGS. 7 and 8, the fiber dissolution mechanism of the subject fibers is unique. As dissolution proceeds, the additional surface area exposed by the dissolution of the fiber interiors is expected to increase the dissolution rate. Thus, initial dissolution rates, $k_{dis}$, are believed to be suspect when comparing dissolution rates of the subject fibers with either single glass fibers or with bicomponent fibers as disclosed by U.S. Pat. No. 5,529,596.

Having generally described this invention, a further understanding can be obtained by reference to certain specific examples which are provided herein for purposes of illustration only and are not intended to be limiting unless otherwise specified.

Glasses were prepared according to the formulations in Table 1 by standard pot and marble techniques. Cullet and marbles were prepared conventionally. Cullet and crushed marbles were graded by sieving into ⅛" to ¼" (pass ¼" mesh, retained by ⅛" mesh) particles or ¼"to ½" (pass ½" mesh, retained by ¼" mesh) particles. Particles with a size range of ⅛" to ½" were found to be suitable for production of curly fibers as well, but this broader particle size range was not considered optimal.

TABLE 1

| Glass: | 1 | 2 | 3 | 4 | 5 | 6 | 7 |
|---|---|---|---|---|---|---|---|
| Glass Component: | | | | | | | 1 |
| $SiO_2$ | 57 | 63.8 | 58.2 | 58.1 | 53.1 | 55 | 58.6 |
| $Al_2O_3$ | 5 | 4.6 | 5.8 | 2.02 | 6.44 | 5 | 4.95 |
| CaO | 8 | 4.73 | 2.1 | 6.17 | 3.48 | 10 | 5.87 |
| MgO | 4 | 3.27 | 0 | 4.29 | 0.66 | 2 | 1.83 |
| $Na_2O$ | 17.6 | 17.1 | 13 | 17.8 | 7.49 | 10 | 9.71 |
| $K_2O$ | 0 | 0 | 0 | 0.41 | 1.1 | 0 | 0.98 |
| $Fe_2O_3$ | 0 | 0.2 | 0 | 0.33 | 0.066 | 0 | 0.044 |
| $B_2O_3$ | 8 | 6 | 11.3 | 6.3 | 19.1 | 18 | 18.9 |
| BaO | 0 | 0.3 | 5 | 0.51 | 5.31 | 0 | 0.002 |
| ZnO | | | 4 | 0.095 | 2.65 | | 0.004 |
| $F_2$ | | | 0.6 | | 0.82 | | |
| SrO | | | 0 | 0.01 | 0.137 | | 0.004 |
| $TiO_2$ | | | 0 | 0.013 | 0.009 | | |
| $ZrO_2$ | | | | 3.99 | 0.003 | | 0.061 |
| Total | 99.6 | 100 | 100 | 100.0 | 100.4 | 100 | 101.0 |
| Measured Thermal Expansion Coefficient (×10-7/C) | 88–94 (F or NF) | 90 | 86 | 107 | 71.3 | 75 | 72.6 |
| High Temperature Viscosity (HTV)(F) | 1820 | 1970 | 1965 | 1872 | 1903 | 1826 | 1929 |
| Glass Transition Temperature (Tg)(C) | 540 | 540 | 535 | 561.2 | 551.6 | 550 | 583.9 |
| Liquides Temperature (F) | 1690 | 1690 | <1500 | 1535 | 1493 | 1681 | 166 |

The process equipment used to prepare primaries and to fiberize the primaries were standard commercial items. No modifications were necessary except that all means of pot content agitation were dispensed with in order to maintain the heterogeneous nature of the melt. The pot was a short housing style with 148 tipped orifices. The primaries were conveyed to the burner flame for attenuation using a conventional pull-roll unit from Winder, employing 10 inch (25.4 cm) by 1⅞ inch (4.7 cm) diameter Philpot rollers, a 10 tpi (teeth per inch) (4 teeth/cm) top guide and a 20 tpi (8 teeth/cm) burnoff guide. The center of the rollers was 44 inches (1.11 m) from the metal base of the pot, and 4 inches (10 cm) from the burnoff guide. The pull rolls were operated at 24±5 rpm, drawing the primaries at a rate of 11½ to 12 ft/minute (5.75 to 6 cm/s).

The burners used were BN burners having slot dimensions of ½ inch (12.5 mm) by 8.5 inch (21.6 cm) and ¼ inch (6 mm) by 9⅜ inch (23.8 cm), respectively. During fiberization, the centerline of the burner slot generally came within ⅜ inch (1 cm) of the plane of the primaries descending from the rollers and the same distance from the bottom of the burnoff guide. The attenuated glass traversed a horizontal forming tube 11 inches (28 cm) square by five feet (0.15 m) in length before settling on an inclined foraminous 20 inch (0.5 m) wide conveyor exposed to mild suction on its downward side.

EXAMPLES 1 AND 2

Two 50:50 wt/wt mixtures of glasses 3 and 6 were prepared, one mixture having a particle size range of 1/8" to 1/4" (Example 1), the second having a particle size range of 1/4" to 1/2" (Example 2). The two glass mixtures were subjected to fiberization by the previously described process. The glass primaries were observed to be relatively linear, but the fibers produced were very curly. Microscopic examination of the primaries revealed a random, multilaminer structure in cross-section. Many of the primaries were elliptical rather than round. The relative size of the glass demes was greater in Example 2 as compared to Example 1. FIG. 1 is a photomicrograph of a cross-section of the primaries of Example 2, while FIG. 2 is a photo-micrograph of Example 1. The pot bottom temperatures primary diameters, and fiber diameters were given in Table 2.

TABLE 2

| Example | Pot Bottom Temperature[1] | Average Primary Diameter (Optical) (μm) | Average Fiber Diameter (SEM) (μm) |
|---|---|---|---|
| 1 | 1604° F. | 292 | 0.98 |
| 2 | 1608° F. | 288 | 1.26 |
| 3[2] | 1514° F. | 437 | 3.87 |
| 4 | 1623° F. | 303 | 1.08 |
| 5 | 1606° F. | 242 | 0.90 |

[1]Average of several samples.
[2]Not from production pot. See text.

EXAMPLE 3

The general procedures previously described were used for a multiple-day run in a smaller, non-production pot, with 42 tipless holes of 0.234 inch diameter. The mixed glasses in this case were cullet of glasses 1 and 3. The primaries were controllable and yielded fiber with curly habit. The fibers produced on the second day, while still very curly, were not as curly as on the first day. The first day primaries were brittle, also, while those of the second day were stronger. These changes suggest that pot charge and throughout must be adjusted so as to ensure that melt heterogeneity is maintained and consistent.

EXAMPLES 4–5

Curly fibers were prepared as in example 1 from both coarse (1/4"–1/2") and fine ("1/8–1/4") crushed marbles of glasses 3 and 5. The primary diameters and fiber diameters are presented in Table 2.

EXAMPLES 6–9

The curly, heterogeneous, multicomponent fibers of Examples 1, 2, 4, and 5 were subjected to tests to measure biodissolution rates in simulated physiological solution, as previously described. The results are presented in Table 3. As a comparison, fibers produced from glass 3 alone exhibited a biodissolution rate of 12 ng/cm²-hr. The table indicates that the randomly heterogeneous bicomponent fibers have much higher biodissolution rates than single fibers, and that bicomponent fibers prepared from coarse blends of glasses exhibit slightly higher in vitro dissolution rates that similar fibers prepared from somewhat finer blends.

TABLE 3

| Example | Fiber From Example | K (ng/cm² · hr)[1] |
|---|---|---|
| Comparative | Control[2] | 12 |
| 6 | 1 | 50 |
| 7 | 2 | 42 |
| 8 | 4 | 211 |
| 9 | 5 | 198 |

[1]Average of two trials. All K were within ±> from reported average.
[2]Single glass fiber, not in accordance with subject invention.

Photomicrographs (FIGS. 7 and 8) of the fibers of Example 6 following biodissolution testing reveal an as yet unreported dissolution mechanism which differs greatly from the well accepted radially inward mechanism expected. This pattern is not observed in single component glasses.

Additional pairings of glasses which worked well to produce curly fibers were glasses 2 and 3; glasses 2 and 5; and glasses 3 and 7. Examples of glass pairs which produced heterogeneous melts but were not successful in producing curly fibers by the pot and marble process were glasses 1 and 5 (brittleness); glasses 4 and 5 (limited working temperature range, brittleness from cold pot, waviness from hot pot); glasses 2 and 6 (unstable primaries); and glasses 2 and 7 (inclusions, devitrification, brittleness). It should be noted that while pairs such as glasses 2 and 6 may be unsuitable for pot and marble processing due to unstable (non-linear) primaries, such pairs may be useful in other glass forming processes such as the rotary process. The different temperatures and shorter residence time associated with the rotary process may also cause other combinations to be useful as well.

EXAMPLES 10–12

A series of bicomponent curly fibers were produced by the sliver process. The trials were set up to run one hour on each of three glasses, at a rate of 14 kg/hr. The target fiber diameter was 11 μm. Sliver heads have several collection options, and the one chosen for this trial consisted of pulling the fiber over an ~1 meter diameter drum, scraping the fiber off the drum, collecting through a funnel into a discharge chute, and finally collecting the loose wool into a box. Schuller lubricating oil number 25 was added at a rate of approximately 0.5–0.7 weight percent of the final fiber.

Residence time of the glass in the sliver bushing is approximately 8 minutes, when running at 14 kg/hr. This means that there are between 7 and 8 complete changes of glass in each one hour run. This is significant, as no flushing of the system was performed. Samples were taken near the end of the runs, ensuring that the fibers were as representative as possible of the test glasses.

The Schott and Corning glasses began as rods and were broken into pieces approximately 6 mm in size. The breaking operation probably resulted in some level of fines that are not considered advantageous with respect to consistent melting. The schuller SP 30/42 glass was in pellet form. All glasses were pre-blended in 50/50 quantities prior to being fed to the bushing. The glasses were evaluated in order of anticipated processing difficulty. The 8245/N16B pair was a close match and was run first (Example 10). It demonstrated that two glasses could be brought together in the bushing and form a curly fiber. Because the difference in CTE of the two glasses was relatively small, the amount of curliness was also slight. This run resulted in a drop loss of about 5%. Drop loss refers to the amount of drops or shot that is not converted into fiber, and is lost to the discharge pit. Typical drop loss for the sliver unit used runs between 1% and 5%. The operating temperature of the bushing tips was 1000 to 1150° C.

The 8245/0080 pair (Example 11) had a greater ΔHTV, and performed reasonably well. It generated fiber with greater curl than the 8245/N16B pair. It also resulted in an increase in drop loss, up to 9%. The operating temperature of the bushing tips was 1100° C. to 1150° C.

The third and final run consisted of 7740 and SP 30/42 (Example 12). These glasses have both the highest difference in fiberization temperature and CTE. As expected, they also resulted in the curliest fiber of the three trials, and the greatest drop loss, at approximately 25%. The difference in fiberizing temperatures of these was sufficient to cause the fibers to jump back when broken at the scraper, all the way to the tip. The operating temperature of the bushing tips was approximately 1400° C. The glasses have the characteristics presented in Table 3 below:

TABLE 3

| Property | Glass | | | | |
|---|---|---|---|---|---|
| | Schott 8245 | Schott N16B | Corning 0080 | Pyrex 7740 | Schuller SP 30/42 |
| CTE ($10^{-6}$/° C.) | 5.2 | 8.8 | 9.4 | 3.3 | 8.9 |
| HTV° C. | | | | 1390 | 1082 |
| Work Pt. $10^4$ poise | 1040 | 1065 | 1005 | 1146 | |

EXAMPLES 13–16

Glass fiber filtration media were prepared from bicomponent heterogeneous glasses and standard single glasses from a 48 hole pot and marble unit in fibergrades roughly equivalent to CF-3 and CF-4. The properties of the fiber filtration media are presented in Table 4 below. As indicated in the table, the properties of the bicomponent glass filtration media and the standard glass filtration media are similar in terms of thickness, density, binder content, and air erosion, however the bicomponent glass fibers showed significantly higher efficiency and in the CF-4 fiber, a higher dirt loading as well.

TABLE 4

| Example: | 13 | 14 | 15 | 16 |
|---|---|---|---|---|
| | TEST GLASS | | STANDARD GLASS | |
| PROPERTY | "CF-3"# | CF-4## | "CF-3"# | CF-4## |
| THICKNESS (IN) | 0.24 | 0.24 | 0.25 | 0.25 |
| DENSITY (g) | 6.7 | 6.4 | 6.7 | 6.4 |
| BINDER CONTENT (%) | 12.7 | 12.4 | 12.7 | 12.4 |

TABLE 4-continued

| Example: | 13 | 14 | 15 | 16 |
|---|---|---|---|---|
| | TEST GLASS | | STANDARD GLASS | |
| PROPERTY | "CF-3"# | CF-4## | "CF-3"# | CF-4## |
| AIR EROSION (% pass) | 100 | 100 | 100 | 100 |
| EFFICIENCY (%) | 80 | 74 | 69 | 72 |
| DIRT LOADING (g) | NOT TESTED | 16.9 | NOT TESTED | 16.2 |

EXAMPLES 17–20

Four additional fiberglass filtration media were prepared from bicomponent glass and single glasses prepared by the same technique as used in Examples 12–16. Filtration media were thoroughly tested for pressure drop, initial efficiency, average efficiency, dust holding capacity, and several other product properties. Samples were taken from the middle of the rolls generated after a thirty day vacuum pack. As can be seen from the table, the average efficiency for the standard glass product range from 82 to 84 percent while the average efficiency for the bicomponent glass samples range from 88 to 89 percent. Dust holding capacity was similar for all of the samples tested. This data demonstrates the surprising increase in filtering efficiency possible through the use of mixed glass fibers.

TABLE 5

Flat Sheet Dirtloading

| Media | Media gms/sq ft. | Thickness (in.) | Initial ΔP | Avg. ΔP | Initial eff. | Avg. Eff. | Arrest (%) | Avg. Alpha | Dust Cap | Dust Cap per sq ft. |
|---|---|---|---|---|---|---|---|---|---|---|
| Mixed Glass | 6.1 | 0.21 | 0.27 | 0.56 | 67 | 88.6 | 95.5 | 201 | 12.8 | 3.2 |
| Control | 6.5 | 0.23 | 0.25 | 0.49 | 64 | 84.3 | 95.8 | 191 | 11.5 | 2.88 |
| Mixed Glass | 6 | 0.21 | 0.24 | 0.5 | 67 | 87.6 | 99.2 | 214 | 12.9 | 3.23 |
| Control | 6.3 | 0.21 | 0.21 | 0.46 | 58 | 82 | 99.2 | 192 | 12.9 | 3.23 |

EXAMPLES 21–27

Premium grade acoustic insulation was prepared from mixed glass and single glass fibers to compare the properties of one versus the other. The multi-component glasses were made in of a first glass having the composition, in weight percent: $SiO_2$-61.3%; $Al_2O_3$-5.0%; CaO-6.3%; MgO-4.5%; $Na_2O$-21.8%; $K_2O$ 1.1%, with glass 7 as the second glass. Standard acoustic insulation is prepared with a Reemay backing in order to provide sufficient support for the media. The standard binder is a melamine binder again selected to provide stiffness in the insulation material. Approximately 3000 pounds of mixed glass were prepared for this trial, consisting of equal blends of the above two identified glasses. The trial was run in several stages, assuming that the goal of each of the preceding stages would have been met prior to the succeeding stage. The results are presented in Table 6 below. Examples 21 and 22 are controls utilizing a single component glass. Examples 21–25 utilize the standard melamine binder while Examples 26 and 27 employed a lesser cost phenolic binder. Control examples 21 and 22 required a Reemay scrim while Examples 23–27 did not.

TABLE 6

| Example | Binder | L.O.I. | Density | Thickness | Reemay |
|---------|----------|--------|----------|-----------|--------|
| 21 | Melamine | 10% | 0.34 pcf | 1 in. | Yes |
| 22 | Melamine | 10% | 0.31 pcf | 1 in. | Yes |
| 23 | Melamine | 10% | 0.34 pcf | 1 in. | No |
| 24 | Melamine | 10% | 0.31 pcf | 1 in. | No |
| 25 | Melamine | 15% | 0.34 pcf | 1 in. | No |
| 26 | Phenolic | 15% | 0.34 pcf | 1 in. | No |
| 27 | Phenolic | 25% | 0.31 pcf | 1 in. | No |

The targeted air flow resistance for a one inch product with a 0.34 pcf density is 400±88 rayles, tested according to ASTM test C-522. The standard or control product exhibited an air flow resistance of 479 rayles, and the experimental products offered similar air flow resistance. This trial demonstrated that mixed glasses can be utilized to produce insulation rolls with fiber diameters in the $5\times10^{-5}$ (AA) range in densities below 0.3 pcf. On the particular unit used, premium acoustic insulation without backing can be formed with either melamine or phenolic binders at binder levels from 9 to 19 percent.

Having now fully described the invention, it will be apparent to one of ordinary skill in the art that many changes and modifications can be made thereto without departing from the spirit or scope of the invention as set forth herein.

What is claimed is:

1. Glass primaries having an average diameter between about 10 $\mu$m and 1000 $\mu$m, said primaries comprising on average a randomly variegated structure having a random multiplicity of demes of distinct glasses when viewed in cross-section.

2. The primaries of claim 1, wherein the distribution of said multiplicity of demes changes randomly along the primaries' axes.

3. The primaries of claim 1, wherein said multiplicity of demes comprise a random, multi-laminar distribution of glasses.

4. The primaries of claim 3, wherein the primaries, on average, are elliptical in cross-section, the major axis of the elliptical cross-section coinciding with a principle direction of laminations of said multi-laminar distribution of glasses.

5. The glass primaries of claim 1, wherein at least two different high boron-content glasses are employed, said glasses falling within the compositional range comprising, in weight percent:

50–64% $SiO_2$,
1–6% $Al_2O_3$,
11–24% $B_2O_3$,
8–16% $Na_2O$,
0–3% $K_2O$,
2–9% CaO, and
1–7% MgO.

6. Curly glass fibers prepared from at least two distinct glasses distributed within the fibers, said fibers characterized by a dissolution mechanism in simulated physiological fluid which preferentially dissolves portions of said fibers, resulting in a compartmentalized skeleton when viewed by scanning electron microscopy.

7. The glass fibers of claim 6 further characterized by numerous longitudinal and lateral cracks in said fibers revealed following partial dissolution of said fibers.

8. The curly glass fibers of claim 6, wherein at least two different high boron-content glasses are employed, said glasses falling within the compositional range comprising, in weight percent:

50–64% $SiO_2$,
1–6% $Al_2O_3$,
11–24% $B_2O_3$,
8–16% $Na_2O$,
0–3% $K_2O$,
2–9% CaO, and
1–7% MgO.

9. Multi-component curly glass fibers having fiber diameters from 0.05 $\mu$m to about 15 $\mu$m, said fibers characterized by a cross-section exhibiting, on average, a randomly variegated structure having a multiplicity of distinct glass demes.

10. The curly glass fibers of claim 9, wherein the glass fibers exhibit a biodissolution rate of at least 42 $ng/cm^2$.hr.

11. The multi-component of curly glass fibers of claim 9, wherein the fibers exhibit a biodissolution rate of at least 198 $ng/cm^2$.hr.

12. The multi-component curly glass fibers of claim 9 wherein at least two different high boron-content glasses are employed, said glasses falling within the compositional range comprising, in weight percent:

50–64% $SiO_2$,
1–6% $Al_2O_3$,
11–24% $B_2O_3$,
8–16% $Na_2O$,
0–3% $K_2O$,
2–9% CaO, and
1–7% MgO.

13. A curly glass fiber prepared from two distinct glasses, said glasses each falling within the compositional range comprising, in weight percent:

50–64% $SiO_2$,
1–6% $Al_2O_3$,
11–24% $B_2O_3$,
8–16% $Na_2O$,
0–3% $K_2O$,
2–9% CaO, and
1–7% MgO.

14. Acoustic insulation comprised of multi-component curly glass fibers having fiber diameters from 0.05 $\mu$m to about 15 $\mu$m, with said fibers being characterized by a cross-section exhibiting, on average, a randomly variegated structure having a random multiplicity of distinct glass demes.

15. The acoustic insulation of claim 14 wherein the density of said insulation is less than about 0.3 $lb/ft^3$.

16. The acoustic insulation of claim 14 wherein said insulation is free of a scrim backing material.

17. The acoustic insulation of claim 14 wherein said acoustic insulation further comprises a phenolic binder.

18. Glass fiber filtration media comprised of multi-component curly glass fibers having fiber diameters from 0.05 $\mu$m to about 15 $\mu$m, with said fiber being characterized by a cross-section exhibiting, on average, a randomly variegated structure having a random multiplicity of distinct glass demes.

* * * * *